US012731777B2

(12) United States Patent
Suzuki et al.

(10) Patent No.: US 12,731,777 B2
(45) Date of Patent: Sep. 8, 2026

(54) POWDER TRANSFER ROLLER DEVICE AND POWDER TRANSFER METHOD

(71) Applicant: SINTOKOGIO, LTD., Nagoya (JP)

(72) Inventors: Keita Suzuki, Nagoya (JP); Kojiro Sasa, Nagoya (JP); Shogo Nakajima, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 528 days.

(21) Appl. No.: 18/303,711

(22) Filed: Apr. 20, 2023

(65) Prior Publication Data

US 2023/0378421 A1 Nov. 23, 2023

(30) Foreign Application Priority Data

May 23, 2022 (JP) ................................. 2022-083960

(51) Int. Cl.
*H01M 4/04* (2006.01)

(52) U.S. Cl.
CPC ................................. *H01M 4/0435* (2013.01)

(58) Field of Classification Search
None
See application file for complete search history.

(56) References Cited

U.S. PATENT DOCUMENTS 1,671,868 A * 5/1928 McGougan ............. B01F 25/62
241/97
5,597,618 A 1/1997 Bayer, Jr. et al.
6,074,480 A 6/2000 Kakuta
2021/0288302 A1* 9/2021 Jamadar .............. H01M 4/0404
2023/0187600 A1* 6/2023 Jeong ...................... B05C 1/083
156/242

FOREIGN PATENT DOCUMENTS

| | | | | |
|---|---|---|---|---|
| CN | 110890519 A * | 3/2020 | ............. H01M 4/08 |
| EP | 0867248 A1 | 9/1998 | |
| JP | H07-303852 A | 11/1995 | |
| JP | H09-253549 A | 9/1997 | |
| JP | H10-277455 A | 10/1998 | |
| JP | 2000-080406 A | 3/2000 | |
| JP | 2001-076712 A | 3/2001 | |
| JP | 2004-223447 A | 8/2004 | |
| JP | 2014-240034 A | 12/2014 | |
| JP | 2017-091726 A | 5/2017 | |

(Continued)

OTHER PUBLICATIONS

Machine English translation of JP-2018063776-A, accessed Jan. 6, 2026 (Year: 2018).*

(Continued)

*Primary Examiner* — Abbas Rashid
*Assistant Examiner* — Adrianna N Konves
(74) *Attorney, Agent, or Firm* — Harness, Dickey & Pierce, P.L.C.

(57) ABSTRACT

A powder transfer roller device includes a first roller having a raised portion provided in a part of the circumferential surface of the first roller; a second roller which is opposed to the first roller and which compacts, between the second roller and the raised portion of the first roller, powder supplied between the first roller and the second roller; and a powder supplying device configured to supply powder between the first roller and the second roller.

9 Claims, 5 Drawing Sheets

(56) References Cited

FOREIGN PATENT DOCUMENTS

| | | | | |
|---|---|---|---|---|
| JP | 2018063776 | A | * | 4/2018 |
| JP | 2020146625 | A | * | 9/2020 |

OTHER PUBLICATIONS

Machine English translation of JP-2020146625-A, accessed Jan. 6, 2026 (Year: 2020).*

Machine English translation of CN110890519, Accessed May 26, 2026 (Year: 2020).*

Office Action dated Feb. 3, 2026 issued in Japanese patent application No. 2022-083960.

Office Action dated Jun. 9, 2026 issued in Japanese patent application No. 2022-083960.

* cited by examiner

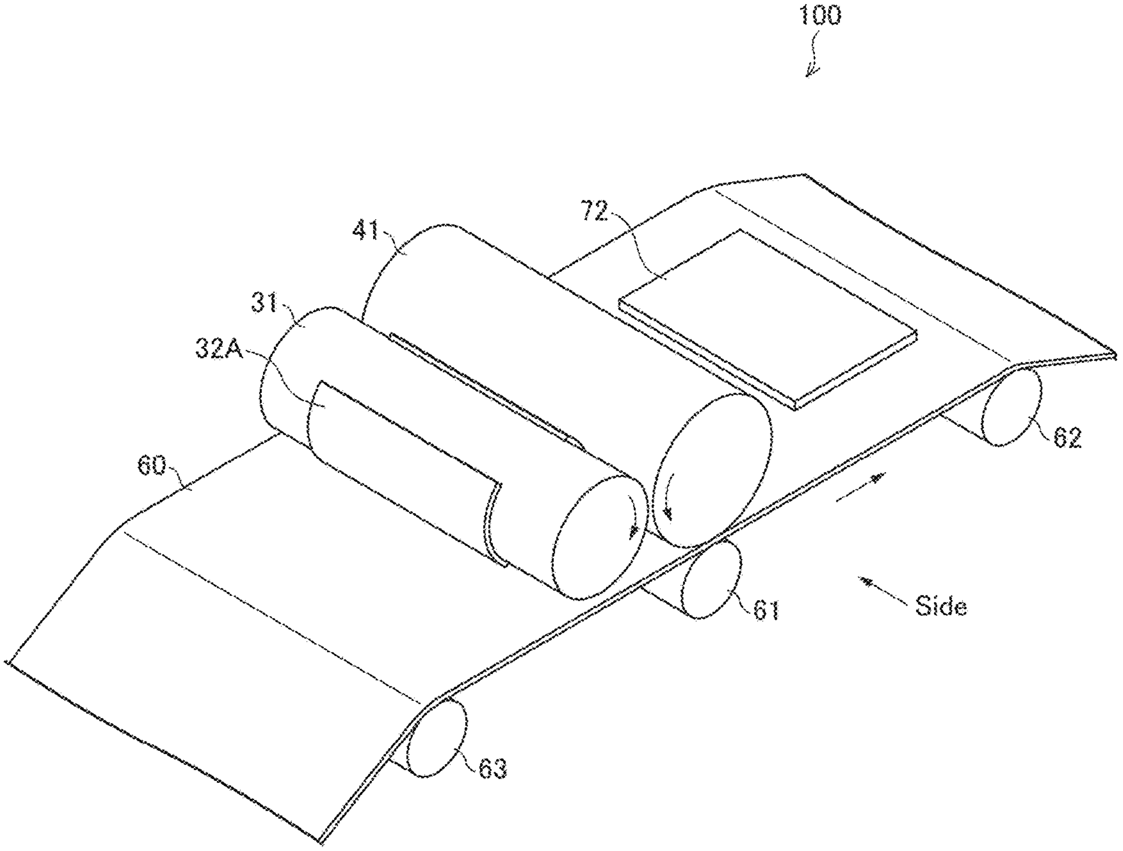

Side

63

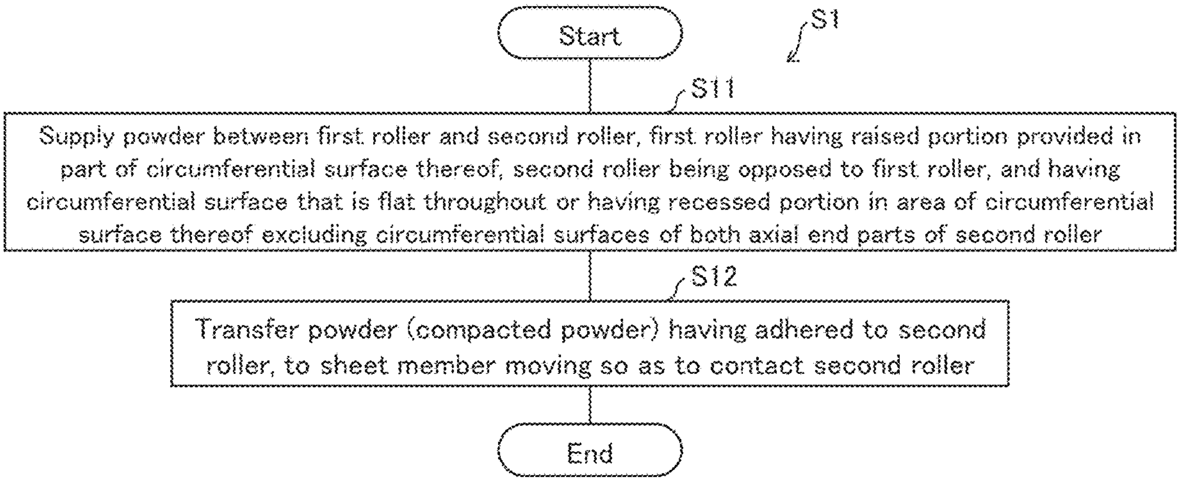

Start

S11

Supply powder between first roller and second roller, first roller having raised portion provided in part of circumferential surface thereof, second roller being opposed to first roller, and having circumferential surface that is flat throughout or having recessed portion in area of circumferential surface thereof excluding circumferential surfaces of both axial end parts of second roller FIG. 5
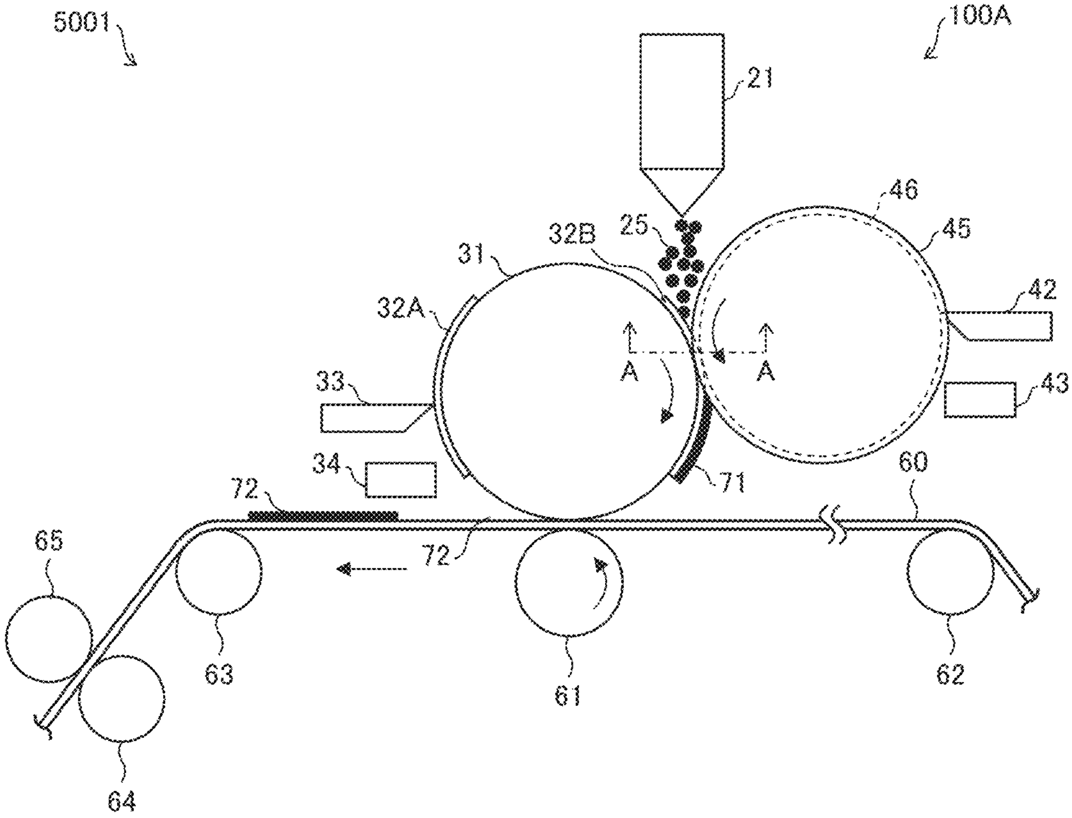
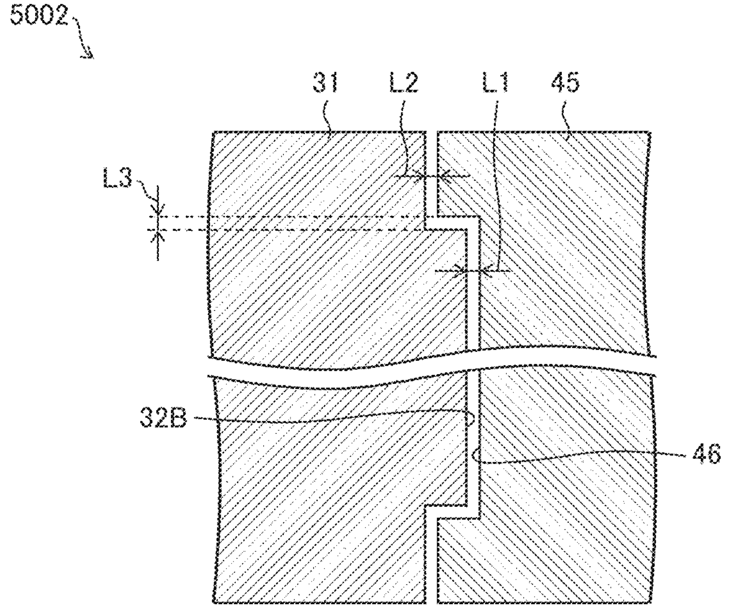

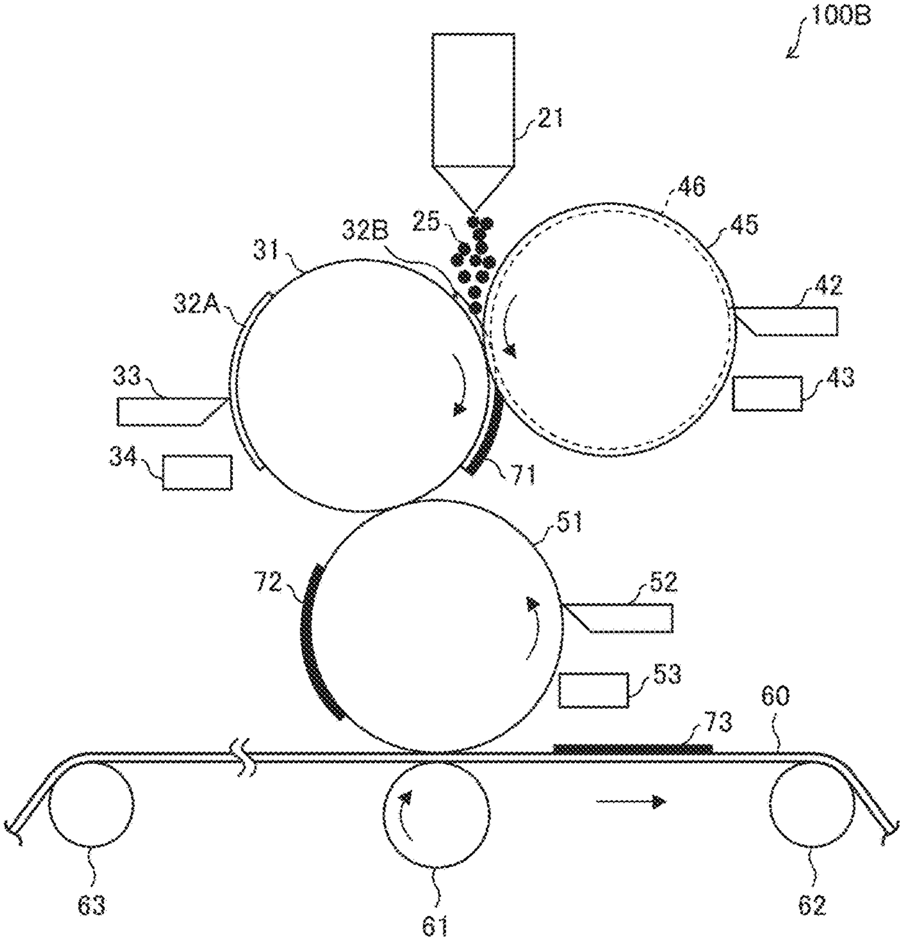

FIG. 8

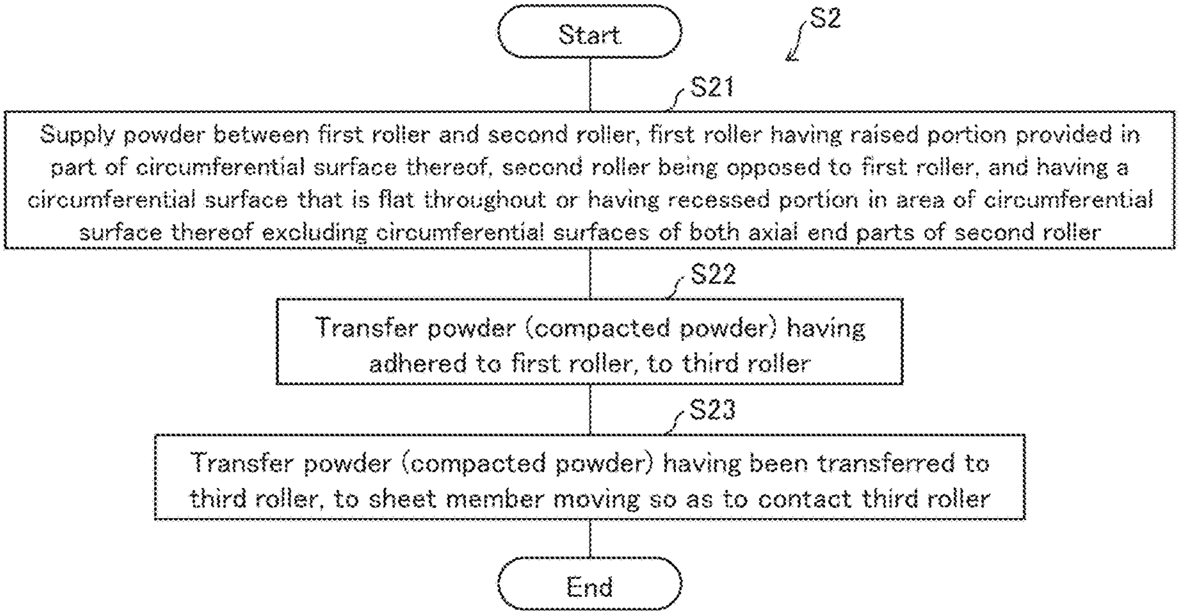

Supply powder between first roller and second roller, first roller having raised portion provided in part of circumferential surface thereof, second roller being opposed to first roller, and having a circumferential surface that is flat throughout or having recessed portion in area of circumferential surface thereof excluding circumferential surfaces of both axial end parts of second roller

POWDER TRANSFER ROLLER DEVICE AND POWDER TRANSFER METHOD

This Nonprovisional application claims priority under 35 U.S.C. § 119 on Patent Application No. 2022-083960 filed in Japan on May 23, 2022, the entire contents of which are hereby incorporated by reference.

TECHNICAL FIELD

The present invention relates to a powder transfer roller device and a powder transfer method.

BACKGROUND ART

As a secondary battery used in mobile terminals, electric vehicles, etc., a lithium-ion battery is known. In a lithium-ion battery, a lithium ion-containing transition metal oxide is used in the positive electrode, and a carbon-based material is used in the negative-electrode active material. The positive and negative electrodes are disposed in a lithium ion-containing electrolyte with a separator sandwiched therebetween. The movements of the lithium ions between the positive and negative electrodes in the electrolyte cause charge and discharge.

As the active material of the positive electrode, a lithium compound containing oxides of cobalt, manganese, nickel, iron phosphate, etc. is used. As the active material of the negative electrode, graphite, carbon, or the like is used. The positive and negative electrodes in which such materials are used have been produced by applying, to current collecting foil, slurry electrode materials in which the active materials above, a conductive agent, a binder, etc. are dispersed in a solvent and drying the slurry electrode materials. For example, Patent Literature 1 discloses an electrode plate production device that includes: a drying device which is provided above and apart from current collecting foil and which is configured to dry slurry electrode materials applied to the upper surface of the current collecting foil; and a heating device which is provided in contact with the current collecting foil and which is configured to heat the electrode materials in parallel with the drying by the drying device. Using such a production device allows the control of an abrupt increase in the temperature of the electrode materials, and is considered to be capable of reducing the occurrence of migration.

CITATION LIST

Patent Literature

[Patent Literature 1]

Japanese Patent Application Publication, Tokukai, No. 2017-91726

SUMMARY OF INVENTION

Technical Problem

However, the conventional technique as described above requires heating to dry the slurry electrode materials. As a drying method, an electrical drying method is commonly used, as is used also in Patent Literature 1. However, an electrical drying method has the problem of high consumption of electrical power. It is therefore desirable to process the electrode materials into an electrode plate with the electrode materials being kept in powder form without changing the form of the electrode materials into a slurry.

In view of the above problem, an object of an aspect of the present invention is to provide a technique for molding a powdery material into a desired shape with the powdery material being kept in a powder state.

Solution to Problem

In order for the above problem to be solved, a powder transfer roller device in accordance with an aspect of the present invention includes: a first roller having a raised portion provided in a part of the circumferential surface of the first roller; a second roller which is opposed to the first roller and which compacts, between the raised portion of the first roller and the second roller, powder supplied between the first roller and the second roller; and a powder supplying device configured to supply powder between the first roller and the second roller.

Further, in order for the above problem to be solved, a powder transfer method in accordance with an aspect of the present invention includes the steps of: (i) supplying powder between a first roller and a second roller, the first roller having a raised portion provided in a part of a circumferential surface of the first roller, the second roller being opposed to the first roller, and having a circumferential surface that is flat throughout or having a recessed portion in an area of the circumferential surface of the second roller, the area excluding circumferential surfaces of both axial end parts of the second roller; and (ii) transferring the powder adhering to the second roller to a sheet member that moves so as to contact the second roller, the second roller rotating at a circumferential velocity greater than a circumferential velocity of the first roller in the step (i), the sheet member moving at a moving velocity greater than the circumferential velocity of the second roller in the step (ii).

Advantageous Effects of Invention

According to an aspect of the present invention, it is possible to provide a technique for molding a powdery material into a desired shape with the powdery material being kept in a powder state.

BRIEF DESCRIPTION OF DRAWINGS

FIG. 3 is a perspective view of the powder transfer roller device in accordance with Embodiment 1.

FIG. 4 is a flowchart illustrating the flow of a powder transfer method in accordance with Embodiment 1.

FIG. 5 is a side view of a powder transfer roller device in accordance with Embodiment 2 of the present invention.

FIG. 8 is a side view of the powder transfer roller device in accordance with Embodiment 3.

FIG. 9 is a flowchart illustrating the flow of a powder transfer method in accordance with Embodiment 3.

DESCRIPTION OF EMBODIMENTS

Embodiment 1

Figure 1:
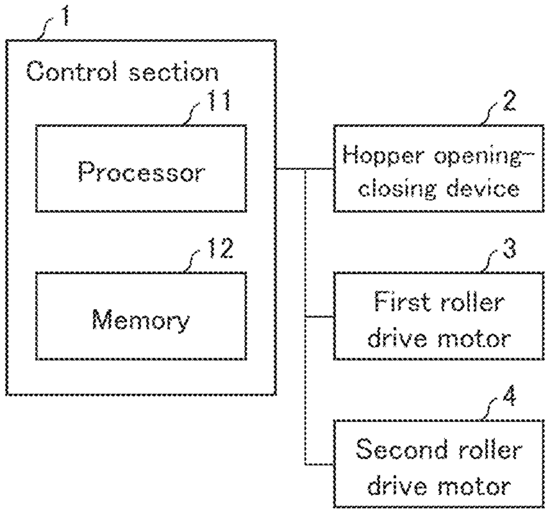
FIG. 1 is a control configuration diagram including a control section of a powder transfer roller device in accordance with Embodiment 1 of the present invention.
Figure 2:
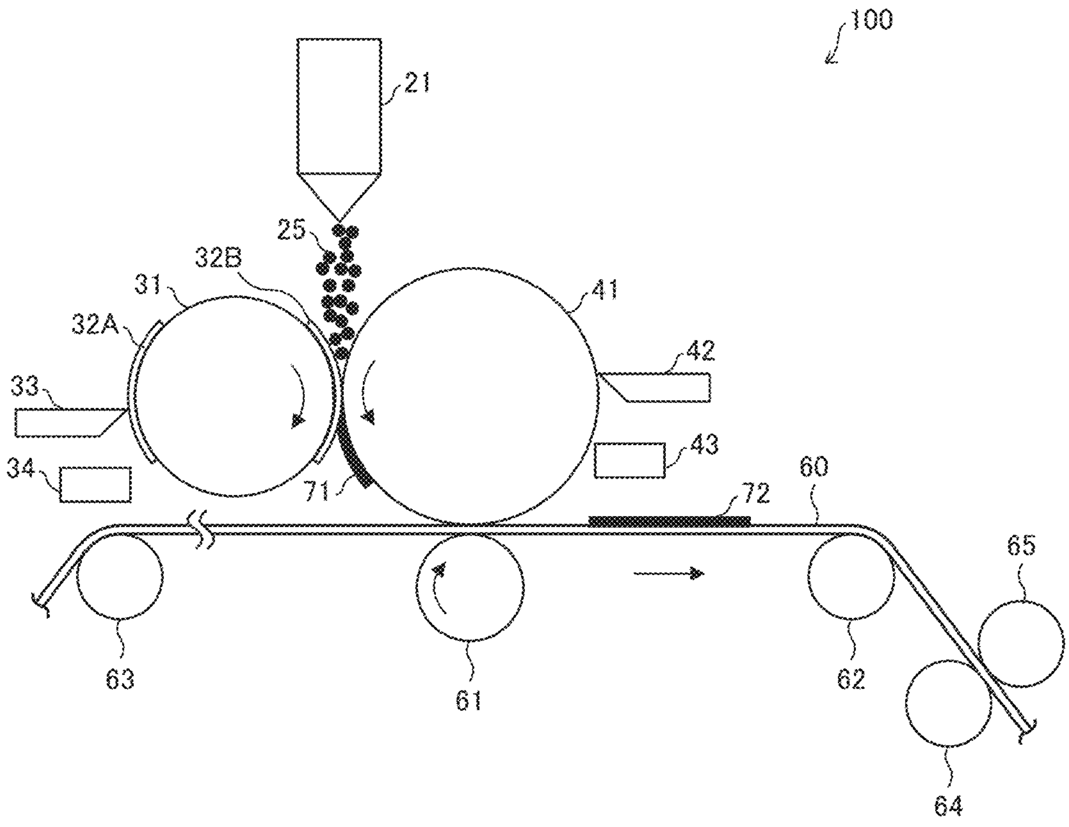
FIG. 2 is a side view of the powder transfer roller device in accordance with Embodiment 1.

The following description will discuss an embodiment of the present invention in detail with reference to the drawings. FIG. 1 is a control configuration diagram including a control section 1 of a powder transfer roller device 100 in accordance with Embodiment 1. FIG. 2 is a side view of the powder transfer roller device 100 in accordance with Embodiment 1. The powder transfer roller device 100 in accordance with Embodiment 1 is a roller transfer device for transferring powder to a sheet member with the powder having a predetermined shape. The powder of Embodiment 1 refers to a powdery or particulate substance. The powder is not limited to any particular size, but preferably has a particle diameter of approximately several micrometers to several hundred micrometers. The powder is not limited to any particular shape, and may have the shape of a sphere or a rod, or even have, for example, an indefinite shape. The powder preferably has the property of adhering to a roller. Although not limited to any particular material, the powder is electrode material powder which serves as the electrode material of the positive or negative electrode of a storage battery in Embodiment 1. Specifically, as described above, examples of the material of the positive electrode include but not limited to: an active material which is a lithium compound containing oxides of cobalt, manganese, nickel, iron phosphate, etc.; a conductive agent; and a binder, and examples of the material of the negative electrode include but not limited to: an active material which is graphite, carbon, or the like; a conductive agent; and a binder.

As illustrated in FIG. 1, the powder transfer roller device 100 includes: a hopper opening-closing device 2; a first roller drive motor 3; a second roller drive motor 4; and the control section 1 which controls these device and motors. As illustrated in FIG. 2, the hopper opening-closing device 2 (not illustrated) is a device for opening and closing a supply port of a hopper (powder supplying device) 21 disposed above a first roller 31 and a second roller 41. When the supply port of the hopper 21 is opened, powder 25 is supplied between the first roller 31 and the second roller 41 that are placed below the supply port. The first roller 31 is driven by the first roller drive motor 3 (not illustrated), and the second roller 41 is driven by the second roller drive motor 4 (not illustrated). Although the hopper 21 is a kind of the powder supplying device recited in the claims, the powder supplying device is not limited to the hopper 21. Note that the control section 1 is not illustrated in FIG. 2.

The control section 1 includes a processor 11 and a memory 12, as illustrated in FIG. 1. The control section 1 controls the hopper opening-closing device 2, the first roller drive motor 3, and the second roller drive motor 4.

The memory 12 is constituted by, for example, various types of volatile random access memories (RAMs) and a non-volatile read only memory (ROM). The ROM stores various programs. Examples of the various programs include a hopper opening-closing device control program, a first roller drive motor control program, and a second roller drive motor control program.

The processor 11 loads, into the RAMs, the various programs stored in the ROM of the memory 12 to execute the various programs, and thus implements the functions of the control section of the hopper opening-closing device 2, the control section of the first roller drive motor 3, and the control section of the second roller drive motor 4. The processor 11 can be formed with use of a general-purpose processor such as a micro processing unit (MPU) or a central processing unit (CPU). In addition, the processor 11 may include a dedicated processor such as an application specific integrated circuit (ASIC), a field programmable gate array (FPGA), or a programmable logic device (PLD).

As illustrated in FIG. 2, the first roller 31 and the second roller 41 compact the powder 25 supplied from the hopper 21 to cause the powder 25 to adhere to the second roller 41. The compacted powder adhering to the second roller 41 is indicated by a reference sign 71. The compacted powder 71 adhering to the second roller 41 is further transferred to a sheet member 60. The compacted powder transferred to the sheet member 60 is indicated by a reference sign 72 in FIG. 2. As used in Embodiment 1, the phrase "powder is transferred" means that the powder adheres to a roller or a sheet member. The compacted powders 71 and 72 are described as thick in FIG. 2 for illustrative purpose, and this thickness does not correspond to reality (is not drawn to scale). The same shall apply hereinafter.

The first roller 31 and the second roller 41 are not limited to any particular material. However, the material is preferably capable of compacting the powder 25 and capable of causing the powder 25 to adhere. Therefore, the first roller 31 and the second roller 41 are preferably made of a metal.

The first roller 31 has a raised portions 32A and 32B provided in parts of the circumferential surface thereof. The raised portions 32A and 32B (which can hereinafter be referred to simply as a "raised portion 32" collectively when the raised portion 32A and the raised portion 32B do not need to be distinguished from each other) are formed in a range excluding both axial end parts in the rotation-axis direction of the first roller 31. The raised portions 32A and 32B are not limited to any particular height from the circumferential surface. The second roller 41 is opposed to the first roller 31, and has a circumferential surface which is flat throughout. The second roller 41 compacts, between the second roller 41 and the raised portions 32A and 32B of the first roller 31, the powder 25 supplied between the first roller 31 and the second roller 41. As used in Embodiment 1, the term "compact" refers to increasing the density of the powder 25 by applying pressure to make the powder 25 solid.

The raised portions 32A and 32B are provided on the first roller 31 for the following reason. When the powder 25 is compacted between the first roller 31 and the second roller 41, if the pressure applied for compacting the powder 25 is too strong, the compacted powder 71 firmly adheres to the second roller 41, and cannot be sufficiently transferred to the sheet member 60. In other words, only the compacted powder 71 that is loosely compacted under weak pressure moderately adheres to the second roller 41, and is further transferred from the second roller 41 to the sheet member 60. For this reason, by providing the raised portions 32A and 32B having a predetermined shape and loosely compact the powder 25 between the raised portions 32A and 32B and the second roller 41, it is possible to transfer, to the sheet member 60, only the powder 25 that is present between the raised portions 32A and 32B and the second roller 41. Therefore, by providing the raised portions 32A and 32B having a predetermined shape, the compacted powder 71 having a shape corresponding to the predetermined shape is transferred to the sheet member 60.

With the above configuration, it is possible to weakly (loosely) compact the powder 25 so as to make the powder 25 suitable for the transfer. By loosely compacting the powder 25, the powder 25 present between the raised portions 32A and 32B and the second roller 41 is loosely compacted and is thus easily transferred to the sheet member 60. The number of the raised portions 32 is not limited to any particular number. The distance by which the circumferential surfaces of the raised portions 32A and 32B are separated from the circumferential surface of the second roller 41 may be approximately 0.1 millimeters to several millimeters.

The circumferential velocity of the second roller 41 is preferably controlled so as to be greater than the circumferential velocity of the first roller 31. Such condition setting promotes the adhesion, to the second roller 41, of the compacted powder 71 having been compacted. Conversely, when the circumferential velocity of the second roller 41 is equal to or smaller than the circumferential velocity of the first roller 31, the compacted powder 71 is less likely to be transferred to the second roller 41. A ratio of the circumferential velocity of the second roller 41 to the circumferential velocity of the first roller 31 is preferably approximately 1.1:1 to 2.0:1, and more preferably approximately 1.4:1 to 1.6:1.

The sheet member 60 moves so as to contact the second roller 41. The moving velocity (conveyance velocity) of the sheet member 60 is preferably greater than the circumferential velocity of the second roller 41. Such condition setting promotes the transfer of the compacted powder 71 to the sheet member 60. A ratio of the moving velocity of the sheet member 60 to the circumferential velocity of the second roller 41 preferably falls within a range which is approximately the same as the above range of the ratio of the circumferential velocity of the second roller 41 to the circumferential velocity of the first roller 31.

The following description will discuss the shape and size of the raised portions 32A and 32B. FIG. 3 is a perspective view of the powder transfer roller device 100 in accordance with Embodiment 1. The shape and size of the raised portions 32A and 32B are formed to correspond to the shape and the size of the positive or negative electrode of the storage battery to be produced. Specifically, the shape of the raised portions 32A and 32B is, for example, a rectangle, as illustrated in FIG. 3. In addition, the size of the raised portions 32A and 32B corresponds to the size of the electrode material to be produced. In other words, the shape of the compacted powder 72 that has been transferred to the sheet member 60 and is to be the electrode material corresponds to the shape of the raised portions 32A and 32B, and the size of the compacted powder 72 corresponds to the size of the raised portions 32A and 32B. Note that when transferred, the compacted powder 72 adheres to the roller rotating at a relatively high velocity or is transferred to the sheet member moving at a relatively high velocity. The compacted powder 72 is therefore transferred to be somewhat longer in the rotation direction or in the moving direction. To address this, the length of the raised portions 32A and 32B in the rotation direction is preferably set to be somewhat shorter than the length of the electrode material.

With the above configuration, the powder transfer roller device 100 allows production of an electrode plate from electrode materials of a storage battery that are in a powder state, without changing the form of the electrode materials to a slurry.

With reference to FIG. 2 again, the sheet member 60 is a member which serves as the current collecting foil of an electrode plate of a storage battery. Specifically, the sheet member 60 is, for example, metal foil such as copper foil. The sheet member 60, which is long, is conveyed by a pair of conveying rollers 64 and 65 in the direction of the arrow in FIG. 2. In addition, tension is applied by tension rollers 62 and 63 to the sheet member 60. Note that the conveying rollers 64 and 65 are driven by two conveying-roller drive motors (not illustrated). The two conveying-roller drive motor are individually controlled by the control section 1. Alternatively, the powder transfer roller device 100 includes a wind-up roller around which the sheet member 60 is wound, and the sheet member 60 may be conveyed by rotating the wind-up roller to wind the sheet member 60 around the wind-up roller (not illustrated). In this case, the wind-up roller is controlled by the control section 1.

The sheet member 60 is supported by a support roller 61, the support roller 61 being opposed to the second roller 41 such that the sheet member 60 is sandwiched between the support roller 61 and the second roller 41. The support roller 61 presses the sheet member 60 against the second roller so as to support the sheet member 60. The support roller 61, which has such a configuration, has the function of assisting in the transfer of the compacted powder 71 to the sheet member 60. The support roller 61 may be made of synthetic rubber, a synthetic resin, or a metal.

As illustrated in FIG. 2, the powder transfer roller device 100 may further include a scraper 33 for scraping powder 25 remaining in the raised portion 32 of the first roller 31 or on the circumferential surface of the first roller 31 except in the raised portion 32 and a collection box for collecting the compacted powder scraped. In addition, the powder transfer roller device 100 may further include a scraper 42 for scraping the compacted powder 71 remaining on the second roller 41 and a collection box 43 for collecting the compacted powder 71 scraped.

(Variation 1)

In the example illustrated in FIG. 2, the first roller 31 is smaller in diameter than the second roller 41. However, the first roller 31 and the second roller 41 are not limited to any particular sizes. In other words, the first roller 31 may be larger in diameter than the second roller 41. Further, the first roller 31 may have approximately the same diameter as the second roller 41 has.

(Variation 2)

In the example illustrated in FIG. 2, the compacted powder 71 adheres to the second roller 41 and the compacted powder 71 is further transferred to the sheet member 60. However, a configuration in which the compacted powder 71 adheres to the first roller 31, and the compacted powder 71 is further transferred to the sheet member 60 may be adopted. To this end, the circumferential velocity of the first roller 31 is set to be greater than the circumferential velocity of the second roller 41. In addition, the sheet member 60 is set to move so as to contact the first roller 31. In this case, the moving velocity of the sheet member 60 is greater than the circumferential velocity of the first roller 31.

With the powder transfer roller device 100 which has the above configuration, it is possible to provide a technique for molding powder 25 into a desired shape with the powder 25 being kept in a powder state.

Embodiment 2

The following description will discuss another embodiment of the present invention with reference to the drawings. For convenience of explanation, the same reference signs will be given to members having the same functions as the members described in the above embodiment, and the descriptions of such members are not repeated.

Figure 6:
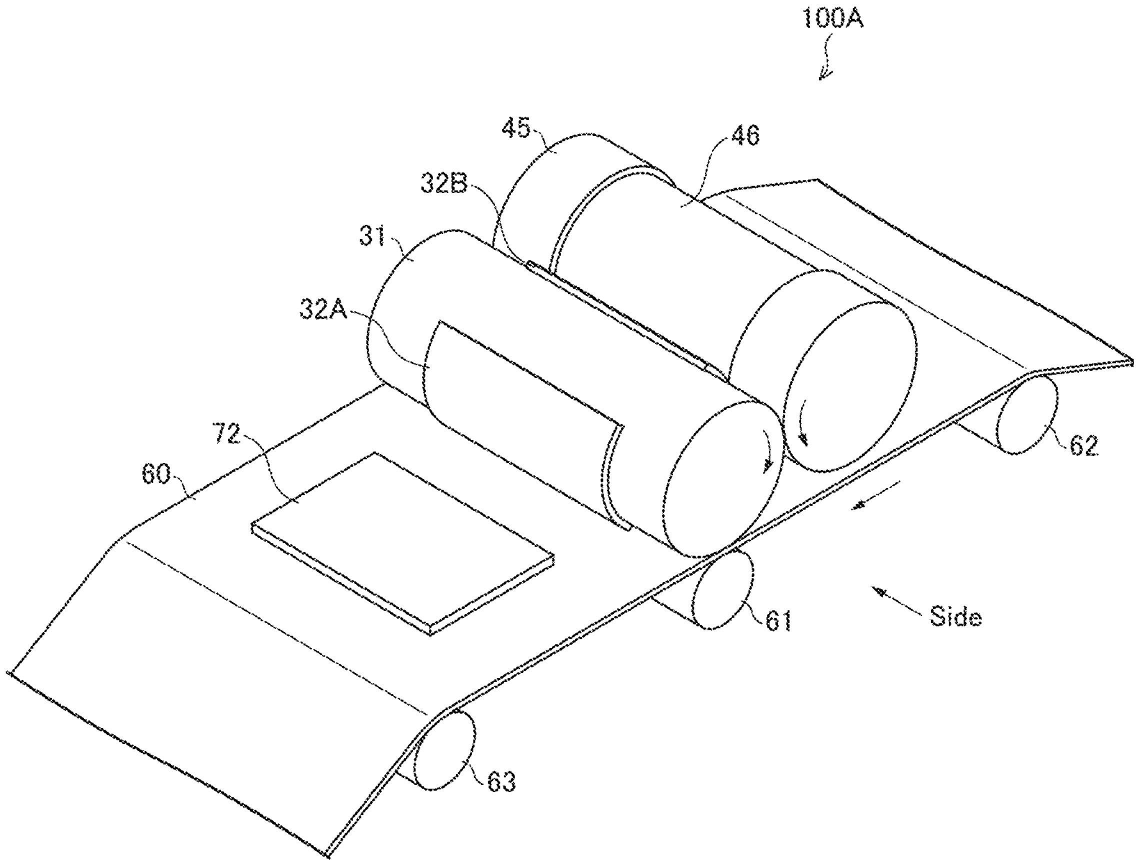
FIG. 6 is a perspective view of the powder transfer roller device in accordance with Embodiment 2.

FIG. 5 is a side view of a powder transfer roller device 100A in accordance with Embodiment 2 of the present invention. FIG. 6 is a perspective view of the powder transfer roller device 100A. A control section 1A of the powder transfer roller device 100A has a configuration similar to that of the control section 1 described in Embodiment 1, and the description thereof is omitted accordingly (see FIG. 1). The powder transfer roller device 100A in accordance with Embodiment 2 is a device used for a purpose similar to that of the powder transfer roller device 100 in accordance with Embodiment 1.

The powder transfer roller device 100A includes: a hopper 21; a first roller 31; a second roller 45; a sheet member 60; and the control section 1A which controls these hopper, rollers, and member, as illustrated in FIG. 5. The powder transfer roller device 100A includes the second roller 45, which differs from the second roller 41 of the powder transfer roller device 100 described in Embodiment 1. Accordingly, the following description will mainly describe the second roller 45, and the descriptions of the other members will be omitted.

The second roller 45 has a recessed portion 46 in an area of the circumferential surface thereof, the area excluding circumferential surfaces of both axial end parts of the second roller 45, as illustrated in FIG. 6. The recessed portion 46 has such a shape as to engage with the raised portions 32A and 32B of the first roller 31. The above "engage" means that the raised portions 32A and 32B of the first roller 31 each have an outer shape complementary to the shape of the recessed portion 46, in order to be fitted into the recessed portion 46, as illustrated in 5002 of FIG. 5. With such a configuration, it is possible to loosely compact the powder 25 to make the powder 25 suitable for transfer. A distance L1 from the outer circumferential surface of the raised portion 32 to the bottom surface of the recessed portion 46 may be approximately 0.1 millimeters (mm) to several millimeters.

A distance L2 from the circumferential surface of both axial end parts of the first roller 31 to the circumferential surface of both axial end parts of the second roller 45 only needs to be greater than the distance L1. This is intended to prevent the hindrance of the function of compacting the powder 25. In addition, a distance L3 between the side surface of the raised portion 32 and the side surface of the recessed portion 46 should be just distant enough for the powder 25 not to be excessively pressed. Making the distance L3 too large is not preferable because the powder 25 escapes in the axial direction.

With use of the second roller 45 which has the above configuration, it is possible to not only obtain effects similar to those provided by the powder transfer roller device 100 described in Embodiment 1, but also reduce the escape, in the axial direction, of the powder 25 supplied.

(Powder Transfer Method S1)

Described next will be a powder transfer method S1 to be carried out with use of the powder transfer roller device 100 described in Embodiment 1 or the powder transfer roller device 100A described in Embodiment 2. FIG. 4 is a flowchart illustrating the flow of a powder transfer method S1 in accordance with Embodiment 1 or 2. The powder transfer method S1 includes the following steps S11 and S12. First, in step S11, the control section 1 controls the hopper opening-closing device 2 to supply powder between the first roller and the second roller, the first roller having a raised portion provided in a part of the circumferential surface of the first roller, the second roller being opposed to the first roller, and having a circumferential surface that is flat throughout or having a recessed portion in an area of the circumferential surface thereof, the area excluding the circumferential surfaces of both axial end parts of the second roller (supply step).

In this supply step S11, the control section 1 carries out control such that the circumferential velocity of the second roller 41 is greater than that of the first roller 31. With this control, the powder 25 supplied is compacted, and adheres to the second roller 41.

Next, in step S12, the control section 1 transfers the powder (compacted powder) 71 having adhered to the second roller 41, to the sheet member 60 moving so as to contact the second roller 41 (transfer step).

Specifically, in this transfer step S12, the control section 1 carries out control such that the moving velocity of the sheet member 60 is greater than the circumferential velocity of the second roller 41. With this control, the compacted powder 71 is transferred to the sheet member 60. The configuration of the sheet member 60 is as described above in the description of the powder transfer roller device 100.

Alternatively, in the supply step S11, the control section 1 may carry out control such that the circumferential velocity of the first roller 31 is greater than that of the second roller 41. In this case, the compacted powder 71 adheres to the raised portion 32 of the first roller 31. Therefore, in step S12, the control section 1 transfers the powder (compacted powder) 71 having adhered to the first roller 31, to the sheet member 60 moving so as to contact the first roller 31 (transfer step). Specifically, in the transfer step S12, the control section 1 carries out control such that the moving velocity of the sheet member 60 is greater than the circumferential velocity of the first roller 31. This method is particularly suitable for the case of using the second roller 45 which has the recessed portion 46.

With the powder transfer method S1, which has the above configuration, it is possible to not only obtain effects similar to those provided by the powder transfer roller device 100 described in Embodiment 1, but also reduce the escape, in the axial direction, of the powder 25 supplied.

The above-described powder transfer roller device 100 or 100A and powder transfer method S1 eliminates the need to dry, as in conventional techniques with use of electrical power, the slurry containing electrode materials when an electrode plate of a storage battery is produced. It is thus possible to significantly reduce the consumption of electrical power required to produce the electrode plate.

Embodiment 3

The following description will discuss another embodiment of the present invention with reference to the drawings. For convenience of explanation, the same reference signs will be given to members having the same functions as the members described in the above embodiment, and the descriptions of such members are not repeated.

Figure 7:
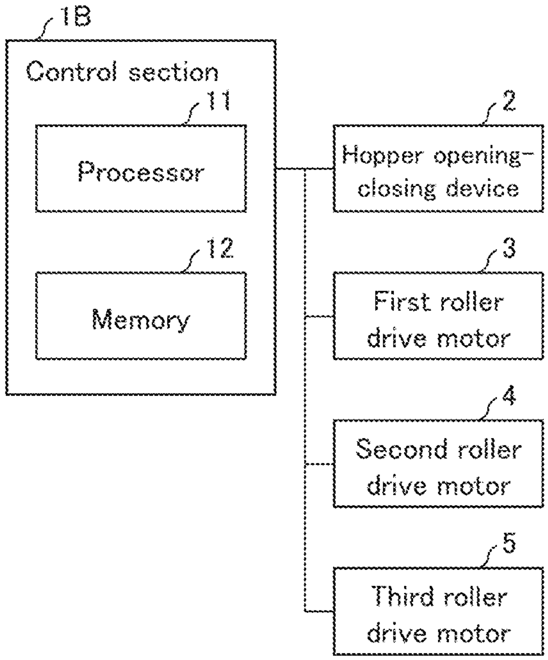
FIG. 7 is a control configuration diagram including a control section of a powder transfer roller device in accordance with Embodiment 3 of the present invention.

FIG. 7 is a control configuration diagram including a control section 1B of a powder transfer roller device 100B in accordance with Embodiment 3 of the present invention. FIG. 8 is a side view of the powder transfer roller device 100B in accordance with Embodiment 3. The powder transfer roller device 100B in accordance with Embodiment 3 is a device used for a purpose similar to that of the powder transfer roller device 100 in accordance with Embodiment 1.

The powder transfer roller device 100B includes: a hopper opening-closing device 2; a first roller drive motor 3; a second roller drive motor 4; a third roller drive motor 5; and the control section 1B which controls these device and motors, as illustrated in FIG. 7. The control section 1B of the powder transfer roller device 100B has a configuration similar to that of the control section 1 described in Embodiment 1, and the description thereof is omitted accordingly (see FIG. 1).

As seen from FIG. 8, the powder transfer roller device 100B differs from the powder transfer roller device 100A described in Embodiment 2 (see FIG. 5) in that the powder transfer roller device 100B includes a third roller 51 and the third roller drive motor 5 (not illustrated). Accordingly, the following description will mainly describe the third roller 51, and the descriptions of the other members will be omitted.

The third roller 51 has a circumferential surface which is flat throughout, and is opposed to the first roller 31. A powder 25 (compacted powder 71) having adhered to a raised portion 32 of a first roller 31 is transferred to the third roller 51. The third roller 51 preferably has a circumferential velocity that is greater than the circumferential velocity of (the raised portion 32 of) the first roller 31. Such condition setting promotes the transfer of the compacted powder 71 to the third roller 51.

The compacted powder 72 transferred to the third roller 51 is then transferred to a sheet member 60, as illustrated in FIG. 8. The compacted powder transferred to the sheet member 60 is indicated by a reference sign 73. It is preferable that the sheet member 60 should move so as to contact the third roller 51 and the sheet member 60 should have a moving velocity that is greater than the circumferential velocity of the third roller 51. Such condition setting promotes the transfer of the compacted powder 71 to the sheet member 60. A ratio of the moving velocity of the sheet member 60 to the circumferential velocity of the third roller 51 preferably falls within a range which is approximately the same as the above range of the ratio of the circumferential velocity of the first roller 31 to the circumferential velocity of the second roller 41. As in Embodiment 1, the sheet member 60 is conveyed by a pair of conveying rollers (not illustrated) and the conveying rollers are controlled by the control section 1B.

In the powder transfer roller device 100B, a support roller 61 is opposed to the third roller 51 such that the sheet member 60 is sandwiched between the support roller 61 and the third roller 51, and the support roller 61 presses, against the third roller 51, the sheet member 60 disposed between the third roller 51 and the support roller 61 so as to support the sheet member 60. The support roller 61, which has such a configuration, has the function of assisting in the transfer of the compacted powder 72 to the sheet member 60.

In addition, the powder transfer roller device 100B may further include a scraper 52 for scraping powder 72 remaining on the third roller 51 and a collection box 53 for collecting the powder 72 scraped.

Described in the example illustrated in FIG. 8 is a configuration in which the compacted powder 71 adhering to the first roller 31 is transferred to the third roller 51. However, a configuration in which the compacted powder 71 adhering to the second roller 45 is transferred to the third roller 51 may be adopted. In this case, it is preferable to adjust the depth of a recessed portion 46 and the height of the raised portion 32 so that the compacted powder 71 adhering to the second roller 45 is transferred to the third roller 51.

(Powder Transfer Method S2)

The following description will discuss a powder transfer method S2 in accordance with Embodiment 3. FIG. 9 is a flowchart illustrating the flow of the powder transfer method S2 in accordance with Embodiment 3. The powder transfer method S2 includes the following steps S21 to S23. First, in step S21, the control section 1B controls the hopper opening-closing device 2 to supply powder between the first roller 31 and the second roller 41 or 45, the first roller 31 having the raised portion 32 provided in a part of the circumferential surface of the first roller 31, the second roller 41 or 45 being opposed to the first roller 31, and having a circumferential surface that is flat throughout or having a recessed portion 46 in an area of the circumferential surface thereof, the area excluding circumferential surfaces of both axial end parts of the second roller 41 or 45 (supply step).

In this supply step S21, the control section 1B carries out control such that the circumferential velocity of the first roller 31 is greater than that of the second roller 41 or 45. With this control, the powder supplied is compacted and adheres to the first roller 31.

Next, in step S22, the powder (compacted powder 71) having adhered to the first roller 31 is transferred to the third roller 51 (first transfer step).

Specifically, in this first transfer step S22, the control section 1B carries out control such that the circumferential velocity of the third roller 51 is greater than the circumferential velocity of the first roller 31. With this control, the compacted powder 71 on the first roller 31 is transferred to the third roller 51.

Next, in step S23, the powder (compacted powder 72) having been transferred to the third roller 51 is transferred to the sheet member 60 moving so as to contact the third roller 51 (second transfer step).

Specifically, in this second transfer step S23, the control section 1B carries out control such that the moving velocity of the sheet member 60 is greater than the circumferential velocity of the third roller 51. With this control, the compacted powder 72 on the third roller 51 is transferred to the sheet member 60.

With the powder transfer roller device 100B and the powder transfer method S2, which have the above configuration, it is possible to provide a technique for molding powder 25 into a desired shape with the powder 25 being kept in a powder state. In addition, with use of the third roller 51, it is possible to remove the compacted powder 71 that is excessive to selectively transfer, to the sheet member, only the compacted powder 71 that is caused to adhere to the raised portion 32.

Such a configuration eliminates the need to dry, as in conventional techniques with use of electrical power, the slurry containing electrode materials when an electrode plate of a storage battery is produced. It is thus possible to significantly reduce the consumption of electrical power required to produce the electrode plate.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1, 1B: Control section
2: Hopper opening-closing device
3: First roller drive motor
4: Second roller drive motor
5: Third roller drive motor
11: Processor
12: Memory
21: Hopper
25: Powder

31: First roller
32: recessed portion
33, 42, 52: Scraper
34, 43, 53: Collection box
41, 45: Second roller
51: Third roller
60: Sheet member
61: Support roller
62, 63: Tension roller
71, 72, 73: Compacted powder
100, 100A, 100B: Powder transfer roller device

The invention claimed is:

1. A powder transfer roller device comprising:

a first roller having a raised portion that is provided in a part of a circumferential surface of the first roller, and that has a shape and a size corresponding to a shape and a size of an electrode of a storage battery;

a second roller disposed opposite to the first roller and having a recessed portion that has a complementary shape to be engaged with the raised portion with a distance therebetween, the second roller compacting electrode material powder between and the raised portion and the recessed portion, the electrode material powder being supplied between the first roller and the second roller;

a powder supplying device configured to supply the electrode material powder between the first roller and the second roller; and a sheet member that moves so as to contact the second roller, the sheet member moving at a moving velocity greater than a circumferential velocity of the second roller.

2. The powder transfer roller device according to claim 1, wherein the second roller rotates at the circumferential velocity greater than a circumferential velocity of the first roller.

3. The powder transfer roller device according to claim 1, wherein the first roller rotates at a circumferential velocity greater than the circumferential velocity of the second roller.

4. The powder transfer roller device according to claim 3, wherein the member moves so as to contact the first roller, the sheet member moving at a moving velocity greater than the circumferential velocity of the first roller.

5. The powder transfer roller device according to claim 3, further comprising a third roller which is opposed to the first roller and has a circumferential surface that is flat throughout and to which the electrode material powder adhering to the raised portion of the first roller is transferred, the third roller rotating at a circumferential velocity greater than the circumferential velocity of the first roller.

6. The powder transfer roller device according to claim 5, wherein the sheet member moves so as to contact the third roller, the sheet member moving at a moving velocity greater than the circumferential velocity of the third roller.

7. The powder transfer roller device according to claim 6, further comprising a support roller which is opposed to the third roller and which presses, against the third roller, the sheet member disposed between the third roller and the support roller so as to support the sheet member.

8. A powder transfer method, using the powder transfer roller device according to claim 1, comprising the steps of:

(i) supplying powder by the powder transfer roller device between the first roller and the second roller, the second roller having a circumferential surface that is flat throughout or having a recessed portion in an area of the circumferential surface of the second roller, the area excluding circumferential surfaces of both axial end parts of the second roller; and (ii) transferring the powder adhering to the second roller to the sheet member that moves so as to contact the second roller, the second roller rotating at the circumferential velocity greater than a circumferential velocity of the first roller in the step (i), the sheet member moving at the moving velocity greater than the circumferential velocity of the second roller in the step (ii).

9. A non-transitory computer-readable storage medium storing a program, the program causing a computer controlling the powder transfer roller device according to claim 1, to perform the steps of:

(i) supplying powder by the powder transfer roller device between the first roller and the second roller, the second roller having a circumferential surface that is flat throughout or having a recessed portion in an area of the circumferential surface of the second roller, the area excluding circumferential surfaces of both axial end parts of the second roller; and (ii) transferring the powder adhering to the second roller to the sheet member that moves so as to contact the second roller, the second roller rotating at the circumferential velocity greater than a circumferential velocity of the first roller in the step (i), the sheet member moving at the moving velocity greater than the circumferential velocity of the second roller in the step (ii).

* * * * *